United States Patent Office 3,236,799
Patented Feb. 22, 1966

3,236,799
PROCESS OF PREPARING A RUBBER AND OIL LATEX WITH SULFUR
Aurel W. Bourque, Arlington, and George A. Lothrop, Concord, Mass., assignors to W. R. Grace & Co., Cambridge, Mass., a corporation of Connecticut
No Drawing. Filed Apr. 24, 1962, Ser. No. 189,683
7 Claims. (Cl. 260—29.7)

This invention relates to a process of preparing vulcanized artificial aqueous dispersions of organic, thermoplastic, rubber-like materials such as natural and synthetic rubbers and to the products produced thereby. In one particular aspect it relates to a two-step process for preparing vulcanized aqueous dispersions of rubber.

Artificial aqueous dispersions of synthetic and natural rubbers and to the products produced thereby. In one part to be dispersed until plastic, transferring the plasticized stock to an internal mixer and masticating it with addition of a hydrophilic colloid and water until it ceases to be in the continuous phase and becomes dispersed in the aqueous phase. Sulfur or sulfur-containing agents are usually added to these dispersions to vulcanize the dispersed rubber.

Aqueous dispersions of synthetic rubbers such as styrene-butadiene, and also natural rubber, vulcanized in the conventional manner with sulfur and accelerators are not satisfactory as sealing compounds for containers designed for hard-to-hold solvents. This class of solvents comprises: aromatic hydrocarbons such as benzene and toluene; chlorinated hydrocarbons such as methylene chloride; tetrahydrofurane, phenolic compounds, ester-type lubricants and numerous other industrial products. Films formed from the vulcanized dispersions become mushy and partially dissolved, or highly swollen and devoid of any rubbery properties when brought into contact with these solvents. With less aggressive solvents such as aliphatic hydrocarbons and mineral or vegetable oils, the films have adequate resistance.

The process of curing the dispersed rubber with the sole use of sulfur also presents problems. The cure progresses gradually with time, to a point approaching a state of overcure. It is important, therefore, that low sulfur ratios be used. With an advanced state of cure, the rubber loses most of its plastic nature and consequently its sealing properties. Furthermore, a higher degree of cure does not enhance the solvent resistance of the compound film.

It has also been proposed to react rubber latices with an organic peroxide to bring about crosslinking of the rubber molecules. An inherent disadvantage of the sole use of peroxide is that the reaction must be carried out in a sealed vessel under superatmospheric pressure to prevent coagulation.

It is a principal object of the instant invention to overcome the aforementioned disadvantages involved in the sole use of sulfur or peroxide. The present invention provides a simple two-step process for preparing vulcanized aqueous dispersions of rubber which form films with improved properties. In the first step of the process the rubber is partially cured with an organic peroxide, and in the second step, the cure is completed by reacting an aqueous dispersion of the partially cured rubber with sulfur. Briefly, the process is carried out by masticating rubber stock with a suitable plasticizer until a substantially plastic uniform mass is obtained, partially crosslinking the plasticized rubber with an organic peroxide, adding a sufficient amount of water to the rubber to produce a dispersion and curing the dispersed rubber with sulfur. The entire process is carried out in conventional rubber processing equipment under atmospheric conditions.

Films with improved resistance to aggressive solvents such as toluene can be made from dispersions of synthetic and natural rubber vulcanized in accordance with this invention. These films also have physical properties superior to those made from dispersions of the same rubbers cured in the conventional manner with sulfur.

To make this a workable process, it is necessary that the rubber be plasticized with a suitable plasticizer prior to reaction with the peroxide. Generally, rubber compounding oils which are substantially non-volatile and which do not retard the vulcanization process are operable. Hydrocarbon oils having a viscosity of at least 300 Saybolt Universal seconds at 100° F. are satisfactory plasticizers. Oils having a viscosity in the range of 1500 to 2500 Saybolt Universal seconds at 100° F. are preferred. They have low volatility which minimizes fuming and losses during processing. Triglycerides of fatty oil acids, such as soya bean oil, linseed oil and tung oil are also satisfactory plasticizers. A ratio of 30 parts of oil to 70 parts of rubber is the preferred composition. At least about 15 parts of oil to 85 parts of rubber is usually necessary to obtain a stock dispersible in water. Amounts of oil in excess of the preferred composition will produce a compound with progressively less solvent resistance. Acetone extractions indicate there is very little of the oil chemically combined with the rubber as a result of the peroxide reaction, i.e., about 5 percent. Yet, without the oil functioning as an internal plasticizer, the rubber is not dispersible in water. Furthermore, in carrying out the reaction, it is important that all of the oil be mixed with the rubber before the start of the reaction, or else the rubber will be difficult to disperse.

Plasticization of the rubber and partial cross-linking of the plasticized rubber with the peroxide is preferably carried out in a Banbury, or other internal mixer. The compounding of the rubber stock is accompanied with considerable self-heating. To avoid localized reactions with the peroxide, the stock should be maintained at temperatures below about 225 to 250° F. until the peroxide is thoroughly mixed with it. Overheating may be prevented by setting the mixer at low speed and, if necessary, utilizing cooling water.

The reaction between the peroxide and the plasticized stock is ordinarily completed in 3 or 4 minutes at temperatures of about 300–360° F. depending on the particular peroxide used. Further mixing is not necessary because indications are that the peroxide is exhausted. The mixer is preferably raised to a speed high enough to generate the desired reaction temperatures. External heating is not required. Lower temperatures may be used, but the time required for mixing would be too long for the process to be practicable.

The partially crosslinked rubber is dispersed in water in the normal manner with a dispersing agent. Sulfur and accelerators are then added to the dispersion. The final cure is effected by heating the dispersion to about 140° F.

In general, the peroxides of the type usually employed for vulcanizing dry rubber are useful in this invention. Examples of such peroxides are 2,5-dimethyl-di(t-butylperoxy) hexane, dicumyl peroxide, ditertiary-butyl peroxide, tertiary-butyl perbenzoate, ditertiary-butyl diperphthalate and 2,5-ditertiary-butyl peroxide-2,5-dimethyl hexyne.

The preferred peroxide is 2,5-dimethyl-di(t-butylperoxy) hexane. It is commercially available as a 50 percent active material absorbed on whiting as a diluent under the trademark of "Varox." Since it has a half-life of 53 seconds at 350° F., the reaction can be completed in a comparatively short time at elevated temperature.

The quantity of peroxide utilized is dependent upon the degree of crosslinking to be effected in the plasticized rubber stock. For satisfactory processing, some degree of plasticity should be retained in the stock and overcuring with peroxide should be avoided. In general, the quantity of peroxide may vary from about 0.1 to 1.0 weight percent based on the rubber-oil composition. The preferred ratio of 2,5-dimethyl-di(t-butylperoxy) hexane, for example, to produce an optimum crosslinked stock readily dispersible in water is about 0.1 to 0.3 part for 100 parts of rubber-oil composition. The preferred ratio for dicumyl peroxide is about 0.1 to 0.2 part for 100 parts of rubber-oil composition. Higher amounts of peroxide will progressively bring about increased crosslinking and yield a stock substantially indispersible in water. It is possible, therefore, to completely cure the rubber if an excess of peroxide is used. The completely cured stock is crumbly in form and unsuited for further processing in spite of the fairly high concentration of oil therein.

The quantity of sulfur utilized is variable and optimum quantities will vary according to the nature of the composition, i.e., whether an accelerator is present or not, what type of filler is employed, etc. Generally, however, the amount of sulfur will vary from about 0.1 to 0.5 percent by weight of the rubber-oil composition. The preferred amount is from about 0.1 percent to about 0.3 percent by weight.

Conventionally, aqueous dispersions of styrene-butadiene rubber require about 0.5 to 1.0 weight percent sulfur based on the rubber, or rubber-plasticizer composition to be cured. It was found, however, that an aqueous dispersion of a compounded composition of 70 parts styrene-butadiene rubber and 30 parts of oil did not show any evidence of cure when reacted with 0.5 weight percent sulfur. The peroxide reacted product of the same composition, however, was cured with a small amount of sulfur, i.e., 0.2 weight percent. Furthermore, the peroxide reacted product did not show any tendency to overcure with age.

When utilizing the invention, it is apparent that suitable fillers, reinforcing agents, antioxidants, extenders, softeners, processing aids, and other ingredients commonly used in the vulcanization of rubber can be employed.

This invention is applicable to the preparation of vulcanized aqueous dispersions of both natural and synthetic rubbers. The synthetic rubbers include homopolymers, and copolymers of conjugated diolefins, i.e., polybutadiene, polyisoprene, butadiene-styrene copolymers, butadiene-acrylonitrile copolymers, homopolymers and copolymers of methylpentadiene; and polymeric forms of chlorine substitution products of conjugated diolefins, i.e., polychloroprene.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially such common accelerators as piperidinium pentamethylenedithiocarbamate, zinc butylxanthate, zinc ethylxanthate, zinc salt of mercaptobenzothiazole, zinc dimethyldithiocarbamate, and zinc dibutyldithiocarbamate.

This invention is further illustrated by the following examples:

Example I 800 parts of styrene-butadiene rubber (55 percent styrene and 45 percent butadiene, "ARX304") were introduced into a Banbury mixer together with 114 parts of ferric oxide, 60 parts of titanium dioxide, and 171.5 parts of oil ("Circosol 2XH"). The Banbury was set at low speed to maintain the temperature of the stock below about 225 to 250° F. After thorough mixing of the stock, 343 parts of whiting and 171.5 parts of oil ("Circosol 2XH") were added. Typical properties and composition of the oil were as follows:

| | |
|---|---|
| Specific gravity at 60° F. | 0.9483 |
| Viscosity, SUS at 100° F. | 2079 |
| Pour Point, ° F. | +10 |
| Aniline point ° F. | 174 |
| Refractive index | 1.5210 |
| Aromatic carbon atoms, percent | 20 |
| Naphthenic carbon atoms, percent | 39 |
| Paraffinic carbon atoms, percent | 41 |

When the stock became plastic and uniform, 3.42 parts of 2,5-dimethyl-di(t-butylperoxy) hexane in the form of a 50 percent active material absorbed on whiting ("Varox") were added. After thorough mixing of the stock, the Banbury was raised to high speed in order to generate reaction temperatures of 340 to 360° F. When the temperature of the rubber stock reached 340° F., mixing was continued for about 2 minutes at temperatures of 340–360° F. to allow the peroxide to react with the rubber.

To prepare the aqueous dispersion, 875 parts of the rubber stock were transferred from the Banbury to a conventional two-bladed dough mixer and about 6 parts of zinc dibutyldithiocarbamate ("Butyl Zimate") were added to the stock. A solution of 60 parts of casein dissolved in 100 parts of water and 15 parts of 28 percent ammonia was mixed with the stock until a product of uniform consistency was obtained. 1.8 parts of sulfur and 24 parts of zinc oxide were then added to the stock and 600 parts of water were gradually mixed with the stock to form a dispersion.

The dispersion was transferred to a kettle, heated to a temperature of 140° F. for a few minutes and allowed to cool to room temperature.

Example II

In order to observe the effects of the vulcanization, films were cast from the vulcanized dispersion prepared in Example I.

The dispersion was spread over a sheet of polytetrafluoroethylene ("Teflon") and leveled with a conventional thickness gauge set at about 75 mils. The sheet was dried at room temperature for 24 hours. The film was then stripped from the "Teflon" and dried in an oven at 160° F. for 10 minutes. It was approximately 20 to 30 mls. thick.

Standard type dumbbell specimens were cut from the film and tested by standard ASTM methods for modulus tensile strength at maximum elongation. These tests were made on a conventional tensile tester using a cross head speed of 2 inches per minute and an initial grip separation of 2.0 inches. The tensile strength measured 318 p.s.i. and the elongation was 40 percent.

Specimens cast from an aqueous dispersion prepared according to Example I but in which no peroxide was used were tested by the same methods for comparative purposes. The tensile strength measured 225 p.s.i., and the maximum elongation was only 2 percent in this instance.

Example III

To determine the separate and combined effects of the peroxide and sulfur, three separate dispersions of styrene-butadiene rubber (55 percent styrene and 45 percent butadiene, "ARX304") were prepared. For convenience, they are designated as Types A, B and C. Type A was prepared according to the method set forth in Example I except that the peroxide ("Varox") was used in an amount of 0.5 percent by weight of the rubber-oil composition, and sulfur was used in an amount of 0.3 percent by weight of the rubber-oil composition. Type B was prepared in the same manner as Type A except that no sulfur was used. Type C was also prepared in the same manner as Type A except that no partial curing of the plasticized stock was effected with peroxide.

Films were cast from each dispersion according to the method set forth in Example II. Each film was about 20 to 30 mils thick and 2 by 3 inches in area.

The films were immersed in toluene for 36 hours at room temperature. The following solubility data were obtained:

| Type | Percent Peroxide | Percent Sulfur | Percent Extracted by Toluene |
|---|---|---|---|
| A | 0.5 | 0.3 | 23 |
| B | 0.5 | 0.0 | 35 |
| C | 0.0 | 0.3 | (¹) |

¹ Completely soluble.

*Example IV*

An aqueous dispersion of styrene-butadiene rubber (55 percent styrene and 45 percent butadiene, "ARX304") was prepared according to the method set forth in Example I except that 0.2 parts of dicumyl peroxide were used.

Films were cast from the dispersion according to the method set forth in Example II. Each film was about 20 to 30 mils thick and 2 by 3 inches in area.

The films were immersed in toluene for 24 hours at room temperature. A close examination of the films showed only slight attack by the toluene.

*Example V*

An aqueous dispersion of each of the following rubbers was prepared according to the method set forth in Example I:

(a) Polyisoprene rubber ("Isoprene Rubber #305")

(b) 400 parts of styrene-butadiene rubber (55 percent styrene and 45 percent butadiene, "ARX304"), 400 parts of polyisoprene rubber ("Isoprene Rubber #305") and 270 parts of plasticizer ("Circosol 2XH").

Films were cast from each of the two dispersions according to the method set forth in Example II. Each film was about 20 to 30 mils thick in area.

The films were immersed in toluene for 36 hours at room temperature. A close examination of the films showed substantially little attack by the toluene.

We claim:

1. The process of preparing an aqueous vulcanized dispersion of rubber which comprises masticating the rubber with a suitable plasticizer until a substantially plastic mass is obtained, partially cross-linking the plasticized rubber with an organic peroxide, adding a sufficient amount of water to the rubber to produce a dispersion and curing the dispersed rubber with sulfur.

2. The process for preparing an aqueous vulcanized dispersion of rubber selected from the group consisting of polyisoprene, and copolymers of styrene-butadiene which comprises masticating the rubber with a suitable plasticizer in amount sufficient to produce a substantially plastic mass, partially crosslinking the plasticized rubber with an organic peroxide selected from the group consisting of 2,5-dimethyl-di(t-butylperoxy) hexane and dicumyl peroxide, adding a sufficient amount of water to the rubber to produce a dispersion and curing the dispersed rubber with sulfur.

3. The process according to claim 2 wherein the peroxide is 2,5-dimethyl-di(t-butylperoxy) hexane.

4. The process according to claim 2 wherein the peroxide is dicumyl peroxide.

5. The process according to claim 1 wherein the plasticizer is a hydrocarbon oil.

6. The process of preparing an aqueous vulcanized dispersion of styrene-butadiene rubber which comprises masticating the rubber with a hydrocarbon oil in an amount of about 15 to 30 percent by weight of the combined rubber and oil until a substantially plastic mass is obtained, partially crosslinking the plasticized rubber with 2,5-dimethyl-di(t-butylperoxy) hexane in an amount of about 0.1 to 0.3 percent by weight of the rubber-oil composition, adding a sufficient amount of water to the rubber to produce a dispersion and curing the dispersed rubber with sulfur in an amount of about 0.1 to 0.3 percent by weight of the rubber-oil composition.

7. The process of preparing an aqueous vulcanized dispersion of styrene-butadiene rubber and polyisoprene which comprises masticating 50 percent by weight of styrene-butadiene rubber and 50 percent by weight of polyisoprene with a hydrocarbon oil in an amount of about 25 percent by weight of the combined rubber and oil until a substantially plastic mass is obtained, partially crosslinking the plasticized rubber with 2,5-dimethyl-di(t-butylperoxy) hexane in an amount of about 0.3 percent by weight of the rubber-oil composition, adding a sufficient amount of water to the rubber to produce a dispersion and curing the dispersed rubber with sulfur in an amount of about 0.3 percent by weight of the rubber-oil composition.

References Cited by the Examiner

UNITED STATES PATENTS

| Re. 20,777 | 7/1938 | Calcott et al. | 260—29.7 |
| 2,615,009 | 10/1952 | St. John et al. | 260—29.7 |
| 2,717,914 | 9/1955 | Harbison | 260—79.5 |
| 2,916,481 | 12/1959 | Gilmont | 260—96 |
| 2,950,503 | 8/1960 | McRae | 260—96 |
| 3,012,985 | 12/1961 | Zakheim et al. | 260—29.7 |

MURRAY TILLMAN, *Primary Examiner.*

LEON J. BERCOVITZ, *Examiner.*